United States Patent [19]

Bsaibes et al.

[11] Patent Number: 5,701,458
[45] Date of Patent: Dec. 23, 1997

[54] SYSTEM AND METHOD FOR MANAGING ARBITRARY SUBSETS OF ACCESS CONTROL LISTS IN A COMPUTER NETWORK

[75] Inventors: Mounir Emile Bsaibes, Austin; Timothy Roger Kells, Round Rock, both of Tex.

[73] Assignee: International Business Machines Corporation, Armonk, N.Y.

[21] Appl. No.: 531,361

[22] Filed: Sep. 20, 1995

[51] Int. Cl.$^6$ .................................................. G06F 17/30
[52] U.S. Cl. ................................................................ 395/609
[58] Field of Search .................................................. 395/609

[56] References Cited

U.S. PATENT DOCUMENTS

| | | | |
|---|---|---|---|
| 5,265,221 | 11/1993 | Miller | 395/490 |
| 5,283,830 | 2/1994 | Hinsley et al. | 380/25 |
| 5,297,283 | 3/1994 | Kelly, Jr. et al. | 395/650 |
| 5,313,646 | 5/1994 | Hendricks et al. | 395/609 |
| 5,315,657 | 5/1994 | Abadi et al. | 380/25 |
| 5,321,841 | 6/1994 | East et al. | 395/725 |
| 5,335,346 | 8/1994 | Fabbio | 395/609 |
| 5,469,576 | 11/1995 | Dauerer et al. | 395/186 |
| 5,495,521 | 2/1996 | Rangachar | 379/95 |
| 5,584,022 | 12/1996 | Kikuchi et al. | 395/609 |

OTHER PUBLICATIONS

"Domain Based Configuration and Name Management for Distributed Sytsems", K. Twidle et al, IEEE, TH0228-7/88/0000/0147, 1988, pp. 147-153.

"Access Control and Authorization Plan for Customer Control of Network Services", C. Yu, IEEE, CH2682-3/89/0000-0862, 1989, pp. 862-869.

"An Authorization Plan for Commercial Service Systems", C. Yu, IEEE, Th0351-7/90/0000/0376, 1990, pp. 376-383.

"Non-Monotonic Transformation of Access Rights", R. S. Sandhu et al, IEEE, 0-8186-2825-1/92, 1992, pp. 148-161.

"Access Control for a Modular, Extensible Storage Service", J. Bacon et al, IEEE, 0-8186-5835-5/94, 1994, pp. 108-114.

Kelter, "Discritionary Access Controls in a High-Performance Object management System", Proc IEEE Computer Society Symposium on research in Security and Privacy, 20-22 May 1991, pp. 288-299, May 22, 1991.

Pernul et al, "A Multilevel Secure Relational Data Model Based on Views", PROC Seventh Annual Computer Security Applications Conference, 2-6 Dec. 1991, pp. 166-177, Dec. 6, 1991.

Kang et al, "An Integrated Access Control in Heterogeneous Distributed Database Systems", IEEE Region 10 Conference, Tencon 92, 11-13 Nov. 1992, pp. 222-226, Nov. 13, 1992.

Bacon et al, "Access Control for a Modular, Extensible Storage Service", PROC First International Workshop on Services in Distributed and Networked Environments, 27-28 Jun. 1994, pp. 108-114, Jun. 28, 1994.

Primary Examiner—Wayne Amsbury
Attorney, Agent, or Firm—Robert M. Carwell

[57] ABSTRACT

A system and method for managing access control lists (ACL) in a data processing system with a hierarchical object structure permits manipulation of an arbitrary set of ACLs and individual entries within an ACL. A set of actions covering all possible entry updates provides flexibility in manipulating ACLs and removing latent ambiguity. By permitting operation on the arbitrary set of ACLs rather than a resource tree, heterogeneous trees remain after the apply function. A mechanism is provided for identifying specific failures of ACL updates by resource name and error, thereby permitting correction without necessitating re-running the entire apply function.

20 Claims, 6 Drawing Sheets

SYSTEM AND METHOD FOR MANAGING ARBITRARY SUBSETS OF ACCESS CONTROL LISTS IN A COMPUTER NETWORK

TECHNICAL FIELD

The present invention relates in general to a system and method for managing data processing system, and, in particular, to a system and method for efficiently managing access to objects organized in a hierarchical structure in a data processing system.

BACKGROUND OF THE INVENTION

Data may be manipulated in many ways in a modern data processing system, including accessing, encoding, communicating, converting, entering, filing, linking, and mapping data. Due to the large amounts of such data that are available to a user of such a system and the aforementioned wide variety of interactions such users may require with the data, managing such systems often becomes overwhelming in magnitude and complexity. Difficulty in such management and the associated demands on network administrators has given rise in the computer science field to numerous developments such as graphic user interfaces seeking to render handling of data in networks more manageable.

In the course of such management, it often has been found desirable to limit various authorizations or permissions granted to such users. For example, it may be desirable to limit access by certain users or groups of users to certain storage devices, directories, or files within the data processing system to prevent unauthorized use of sensitive data, or to prevent damage to the data processing system through inadvertent alteration or deletion of data or other files. Examples of such different permissions are authority to read, write, or execute files, data, or directories, to modify others' permissions, etc.

One system used to manage access to data in a data processing system is a file system employing "Access Control Lists (ACLs) to identify which users may access an object such as a file or directory, and to identify the type of access that a user has for a particular object. A network manager or system operator may alter such ACLs to change what a user may have access to, the type of access available, and operations which the user is authorized to perform on the accessed data.

In such a system using hierarchical directories, one approach to managing and editing these ACLs in response to the changing users and their respective needs on the network, is to require the network manager or system operator to directly alter access to each directory. Thus, if access to a number of related directories needs to be altered, access to each directory must be changed individually by the system administrator. In a hierarchical file system, directories below a parent directory may have all previous ACLs replaced with that from a parent directory. The parent directory is the directory that is selected for the modification in such a situation.

Such a system can be extremely time consuming and inefficient for the system administrator to use, and therefore it would be advantageous to have a system and method for more efficiently managing ACLs. In U.S. patent application Ser. No. 08/266,083, entitled "Method and System for Managing Access to Objects", now pending, there is disclosed a system which seeks to provide for more efficient management of such ACLs. While the system most assuredly represents an advancement in the art by avoiding the necessity of a system administrator altering each and every ACL individually and avoiding the requirement in some systems that the entirety of the ACLs in a tree be altered, the system nevertheless had additional drawbacks which were in need of improvement.

The most significant problem with such prior art is that it lacks capability to reduce or revoke an individual entry's permissions. Thus, a set of operations were highly desired which would allow for a finer granularity of ACL manipulation whereby each entry on an ACL could be manipulated separately rather than requiring the entirety of the ACL to be modified.

Moreover, as described, a need existed to provide a mechanism permitting an arbitrary set of such ACLs to be manipulated rather than the provision in the prior art for only allowing all ACLs in a hierarchical tree or branch to be manipulated.

Still further, prior art assumed that the caller of a particular function always had complete authority over all objects. When instructions were issued to alter a set of ACLs, if the process failed at some point, only an error code was returned indicating that the process had failed. In modern day data processing systems wherein the number of ACLs which may be required to be changed could number in the hundreds or thousands, it became apparent that this was a serious drawback in prior art systems. Providing the system administrator only the information that the ACL updating process had failed (perhaps even on the last 10 ACLs being updated for example) required the administrator to manually search for ACL updates that had failed or, worse yet, to re-execute the entire process which may be quite time consuming in order to ensure that all of the necessary ACL updates had been effected. Thus, a mechanism was greatly needed for supplying reports which indicated which entries were not updated and the reason for such failures, whereby the system administrator might attend to correcting only these identified failures.

SUMMARY OF THE INVENTION

It is therefore one object of the present invention to provide an improved system and method for managing data in a data processing system.

It is another object of the present invention to provide a system and method for managing access to objects in a data processing system.

It is yet another object of the present invention to provide a system and method for managing access to directories organized in a hierarchical structure in a data processing system.

It is a further object of the invention to provide a system and method for managing ACLs in a data processing system whereby an arbitrary set of ACLs may be manipulated.

It is another object of the present invention to provide a system and method including finer granularity of ACL manipulation whereby each entry on an ACL may be manipulated separately.

It is a further object of the invention to provide a system and method for updating ACLs with a mechanism for reporting which entries were not successfully updated and the reason for failure.

In applying changes to a set of ACLs, a complete ACL may be taken as input, in which case the system and method replaces the existing ACL on each resource. Alternatively, the system and method of the invention accepts a list of different changes which may be made to each respectively different ACLs to produce heterogeneous ACLs. The list consists of the entry to change, the action to perform, and the data needed to perform the action. The data will either be an entry identifier and a set of permissions, or a new user/group name. A set of actions is defined to cover all possible entry updates, thereby allowing flexibility in manipulating the ACLs and removing ambiguity of the action to perform. This set of actions includes: entry_change_user, entry_change_group, entry_create, entry_delete, entry_replace, entry_modify_add, entry_modify_delete, entry_add_or_create, entry_modify_add, entry_replace_or_create, entry_replace_add.

The system and method of the invention further provides for determining the set of ACLs to operate on by using the specified resource name as a route in the tree. The tree is then iterated and each object/container found is operated upon. Alternatively, however, in accordance with the invention, the system and method further provides for accepting a set of resource names. This set is then iterated and each resource's ACL is updated.

It is a further feature of the invention to provide a mechanism for reporting which ACL entry(s) were not updated and the reason for failure. Accordingly, a system and method is provided to handle multiple errors, including an error buffer passed in by the caller. When an ACL update fails, the resource name and error is placed in the buffer as long as sufficient room exists, rather than a mere indication that an error occurred. The administrator by examining the buffer, is thus able to focus on the specific ACL apply commands that failed to rectify their errors. If the buffer is filled, the apply continues, but the failure information is lost. Two return codes may be returned by the apply function when non-fatal errors occur: the buffer_contains_all_failures, and the buffer_contains_some_failures.

In accordance with the foregoing, an extension to the coarse grain apply function wherein input ACL was applied to all containers in the tree starting at a specified resource name is improved upon. More particularly, a finer granularity is provided whereby the administrator may manipulate individual entries. In contrast with the prior systems in which the apply function always results in a tree with homogeneous ACLs, the invention allows for a different set of ACLs to be operated upon rather than just a resource tree, wherein a heterogeneous tree remains heterogeneous after the apply.

Also in accordance with prior art, it was assumed that administrators have access to all ACLs. In accordance with the invention, however, an administrator may not have unilateral access to all ACLs. Thus a system and method is provided with the ability to update each ACL determined by each ACL itself, and the implementation is further tolerant of access_denied errors.

Still further in accordance with the invention, as hereinbefore noted, an alternative method of determining which ACLs are operated upon is provided. The user is permitted to select a specific set of ACLs to operate upon whereby the system and method increases flexibility of the apply function.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying figures, wherein:

DETAILED DESCRIPTION OF THE PREFERRED EMBODIMENTS

Figure 1:
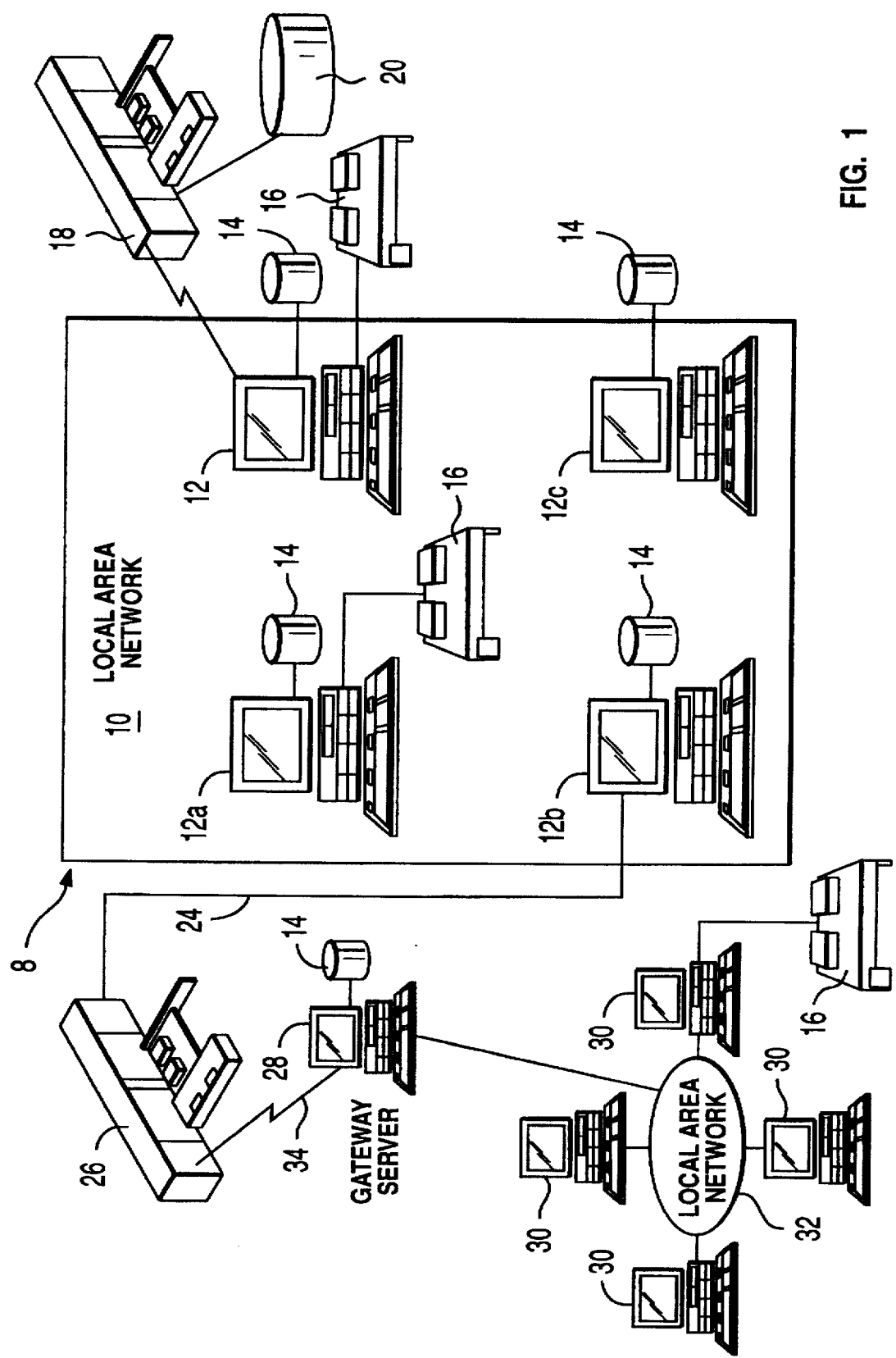
FIG. 1 is a pictorial representation of a data processing system which may be utilized to implement the system and method of the present invention.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12, 12a–12c, and 30, respectively, Computer 12 and 30 may be implemented utilizing any suitable computer such as the IBM Personal System/2 (also called a "PS/2") computer or an IBM RISC SYSTEM/6000 computer, both product of International Business Machines corporation, located in Armonk, N.Y. "RISC SYSTEM/6000" is a trademark of International Business Machines Corporation. "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a midrange computer, such as an Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/ communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2A:
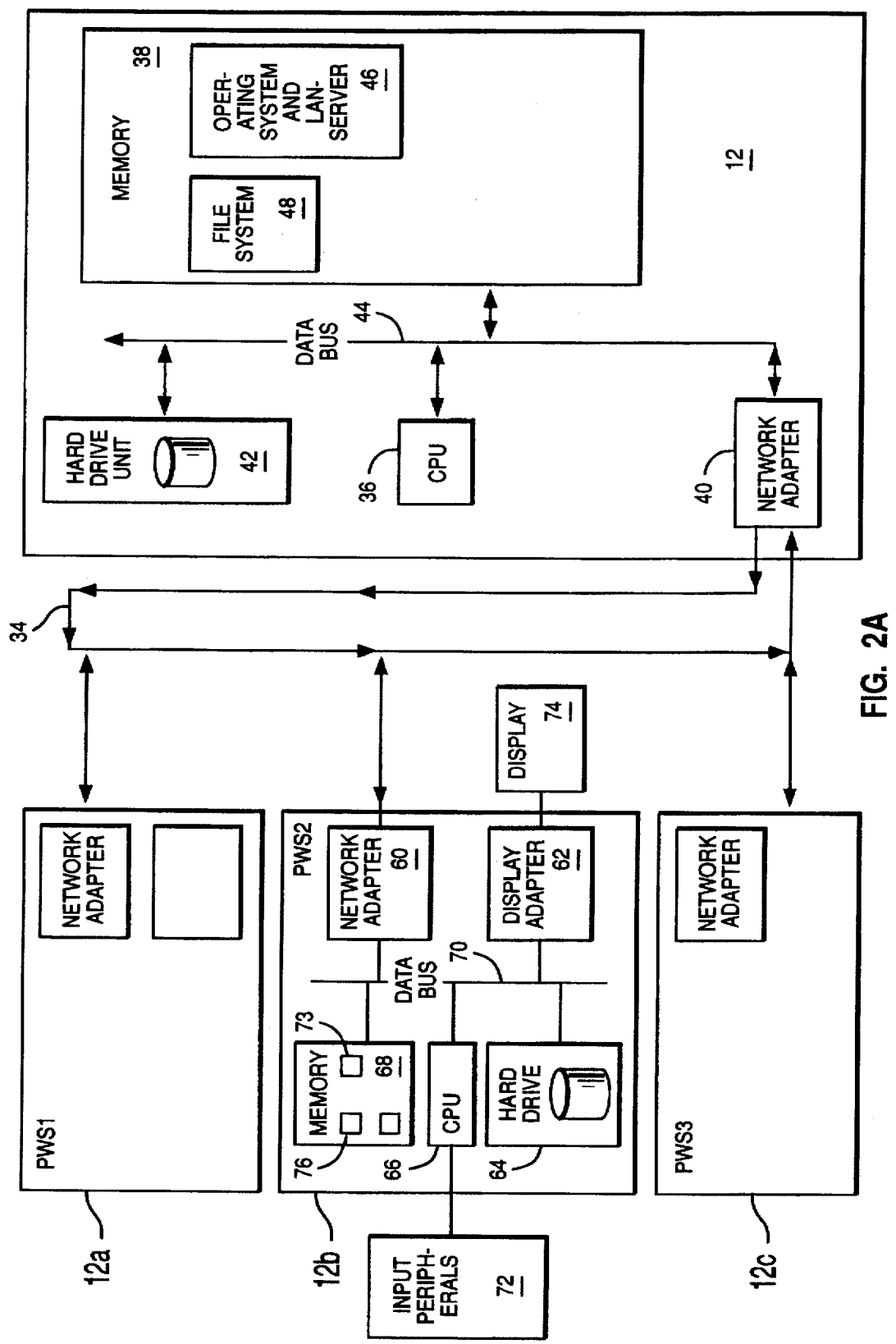
FIG. 2A depicts a block diagram of a Local Area Network from the data processing system illustrated in FIG. 1 for implementing the system and method of the present invention.

A preferred embodiment of the present invention may be incorporated within various computers depicted within data processing system 8. Referring now to FIG. 2A, a block diagram of LAN 10 is depicted for implementing a method and system of the present invention. Server 12 communicates with computer 12a–12c over communications channel 34. LAN 10 is depicted in a token ring geometry, however, other geometries are possible. Server 12 may be a conventional computer, such as an IBM PS/2 or AS/400 system programmed to practice this invention. Server 12 includes a central processing unit (CPU) 35, a memory 38, and a network adapter 40. Network adapter 40 is utilized for formatting outgoing transmissions and for deformatting incoming transmissions. Server 12 also includes a hard drive unit 42 for storing various objects, such as data files or executable code. Objects may be accessed by one or more users, wherein an object may be transferred to computer memory 38 over data bus 44. A number of objects may exist within memory 38. An operating system and local are network server 46 are represented as one object within memory 38.

Various users may access objects by sending a request to file system 48 in server 12 utilizing computers 12a–12c. A "file system" is a collection of files and file management structures that may be located in memory or on a physical or logical mass storage device. Computer 12b is a typical example. Computer 12b operates as a personal work station communicating with server 12. Schematically, computer 12b is substantially similar to server 12, and includes a network adapter 60, a display adapter 52, a hard drive unit 64, a central processing unit (CPU) 66, and addressable memory 68. Components of computer 12b transfer data over data bus 70. CPU 66 directly controls input peripherals 72, which may include a keyboard and a mouse. Display adapter 62 drivers display device 74. Memory 58 includes operating system 73. Memory 68 also includes object 76, which was supplied by computer 12 in response to a request to computer 12.

Figure 2B:
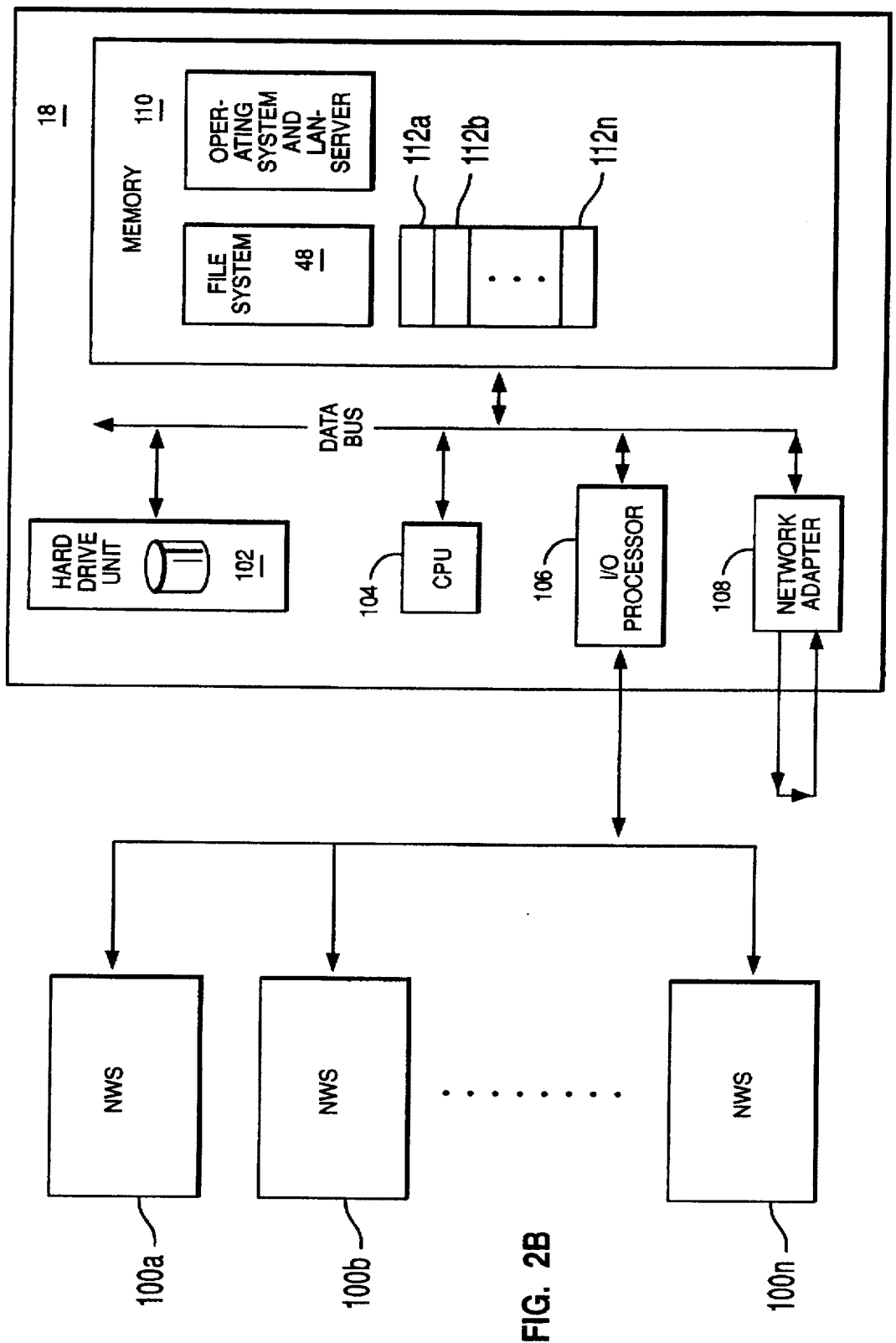
FIG. 2B depicts a block diagram of a mainframe computer from FIG. 1 for implementing the system and method of the present invention.

Referring now to FIG. 2B, a block diagram of mainframe computer 18 is depicted in accordance with a preferred embodiment of the present invention. Mainframe computer 18 is a single computer system running multiple processes, such as an IBM ESA/370 or ESA/390 attached to multiple nonprogrammable work stations (NWS) 100a–100n. Mainframe computer 18 includes a hard drive unit 102, CPU 104, input/output (I/O) processor 106 for communicating with nonprogrammable work stations 100a–100n, network adapter 108, and memory 100. Hard drive unit 102 may store objects. Each nonprogrammable work station may access an object within memory 100 or hard drive unit 102. For example, nonprogrammable work station 100a would access object 112a, nonprogrammable work station 100b would access object 112b, and nonprogrammable work station 100n would access object 112n in accordance with a preferred embodiment of the present invention.

An "object" is any real resource that has an ACL associated with it. In the depicted example, an "object" corresponds to a subdirectory or a file in a hierarchical file system. The "attributes" of an object are represented in an access control list (ACL). A "container object" is an entity that may contain zero or more objects or container objects. In the depicted example, a container corresponds to a directory in a hierarchical file system.

Figure 3:
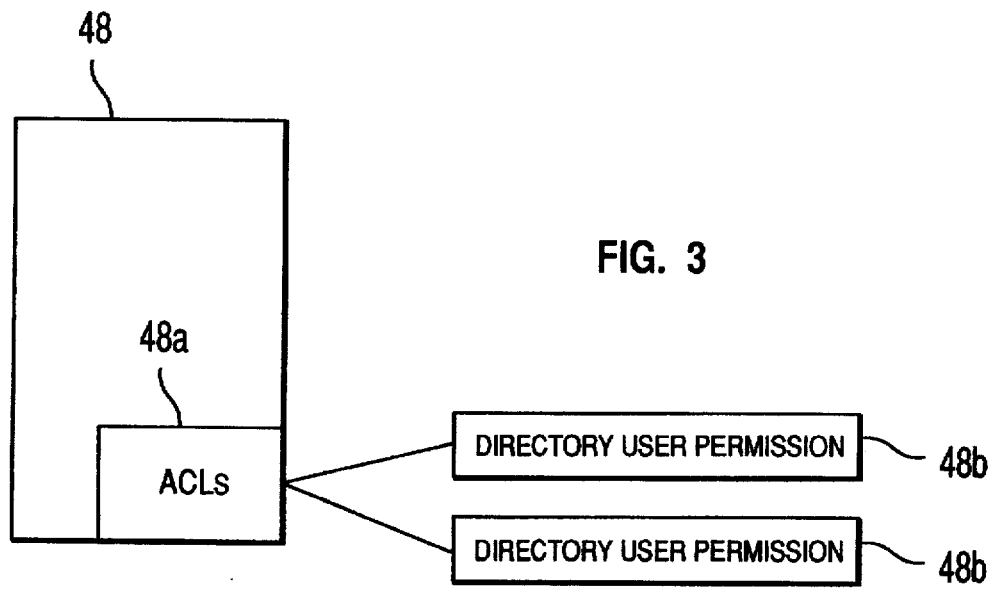
FIG. 3 is a block diagram of a file system, including ACLs and object permissions.

With reference to FIG. 3, file system 48 located in the memory of server 12 or main frame computer 18 includes ACLs 48a. As can be seen, each ACL 48b includes a directory, a user and a permission. An ACL is a list of users and their permissions to an object or container object. An ACL entry is one such user/group permission pair. Users may be combined into a group and inherit their permissions through the group rather than explicitly by a user. Various types of permissions may be granted to a user directly or through a group, such as, for example, delete (may delete object), execute (may execute object), read (may read object), write (may change object), create (may create new objects), permissions (may change ACL of object), and attributes (may change attributes other than ACL). An ACL may be associated with each directory, file, printer or other resource on the computer.

Figure 4A:
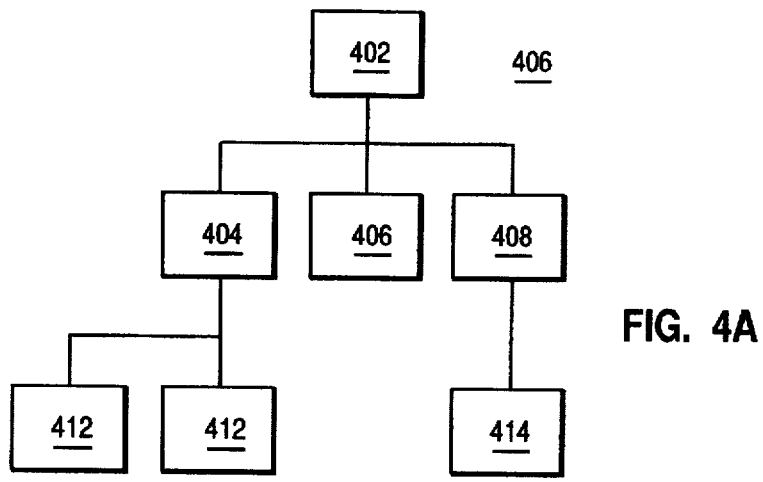
FIG. 4A and 4B depict a route directory tree for a hierarchical file system employed in the present invention.

The present invention provides an application programming interface (API), also called a "procedure", to aid in managing ACLs. The API includes three types of operations: absolute-ACL entries override and replace all previous ACL entries defined for descendant directories: modify-new ACL entry permissions are added or deleted from descendant directory ACLs; rename-ACL entries for a given user are given to a different user;

Referring now to FIG. 4A, a root directory tree 400 in a file system is depicted in accordance with a preferred embodiment of the present invention. Root directory tree 400 includes directories 402–414. In accordance with a preferred embodiment of the present invention, a user selects a target machine that contains files or directories in which the ACLs are to be modified. The parent directory of a hierarchical tree or a set of unrelated objects, are also selected by the user. The parent directory is the starting directory in which ACLs will be modified.

Figure 4B:
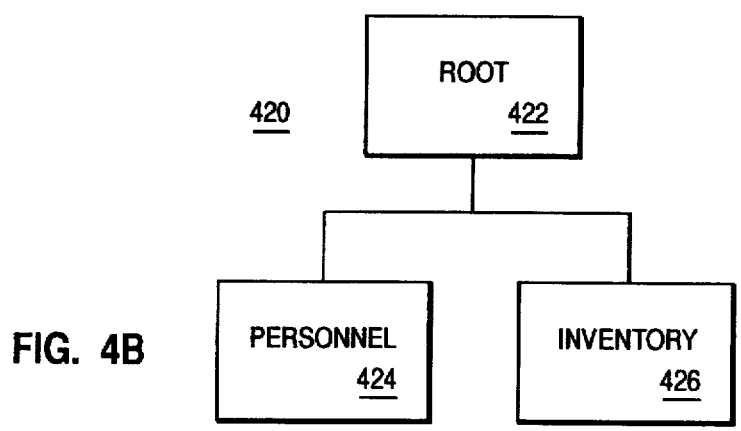

Referring now to FIG. 4B, a diagram of a hierarchical file system is depicted in accordance with a preferred embodiment of the present invention. Root directory tree 400 includes the following container objects (a directory and two subdirectories) in the depicted example: root 402, personnel 404, and inventory 406. Root 402 is the parent to the personnel 404 and inventory 406. Personnel 404 and inventory 406 are sibling container objects. In the depicted example, the ACL (not shown) provides a user read permission for root 402 and write permission for inventory 406. No permission is listed for the user in personnel 404. Various operations may be made to alter the access allowed to the user in accordance with a preferred embodiment of the present invention. If the user chooses an "entry_delete" operation, the result is that the user has no permission to anything in the root directory tree. A "modify_add" operation would result in the user having read permission to personnel 404 and read and write perimission to inventory 406. An "entry-add" operation results in the user having read permission to personnel 404 and write permission to inventory 406 in the depicted example.

The example in FIG. 4B only includes two subdirectories under the selected parent directory route 422. The same operations may be applied to additional directories in the situation in which a subdirectory of the parent directory includes additional subdirectories. Also, although root 422 was selected as the parent directory, directories other than root 422 may be selected in accordance with a preferred embodiment of the present invention. The processes of the present invention are described in further detail in FIGS. 5 and 6 below.

In accordance with the preferred embodiment of the invention, a set of actions is defined to cover all possible entry updates, thereby allowing great flexibility in manipulating ACLs and removing ambiguity of the action to be performed. This set of preferred actions is shown in Table 1.

TABLE 1

| Action | Description |
| --- | --- |
| ENTRY_CHANGE_USER | Input-current user, new user. Changes the id on the ACL entry from the current user to the new user |
| ENTRY_CHANGE_GROUP | Input-current group, new group. Changes the id on the ACL entry from the current group to the new group. |
| ENTRY_CREATE | Input-Entry ID, permissions. An entry is created for the user with the specified permission. If the user exists, nothing is done. |
| ENTRY_DELETE | Input-Entry ID. The entry is deleted if it exists. |
| ENTRY_REPLACE | Input - Entry ID, permissions. If the entry exists the existing set of permissions are replaced with the input permissions. |
| ENTRY_MODIFY_ADD | Input-Entry ID, permissions. If the entry exists, the input permissions are added to the existing set of permissions. |
| ENTRY_MODIFY_DELETE | Input-Entry ID, permissions. If the entry exists, the input permissions are deleted from the existing set of permissions. |
| ENTRY_MODIFY_ADD_OR_CREATE | Input-Entry ID permissions. If the entry exists, perform ENTRY_MODIFY_ADD, if entry does not exist, perform ENTRY_CREATE. |
| ENTRY_REPLACE_OR_CREATE | Input-Entry ID, permissions. If the entry exists, perform ENTRY_REPLACE_ADD, if entry does not exist, perform ENTRY_CREATE. |

Referring now to FIGS. 5–8, examples will be given of how these various actions will affect representative nodes A, B and C (700, 702, 704) of a representative network.

Figure 5:
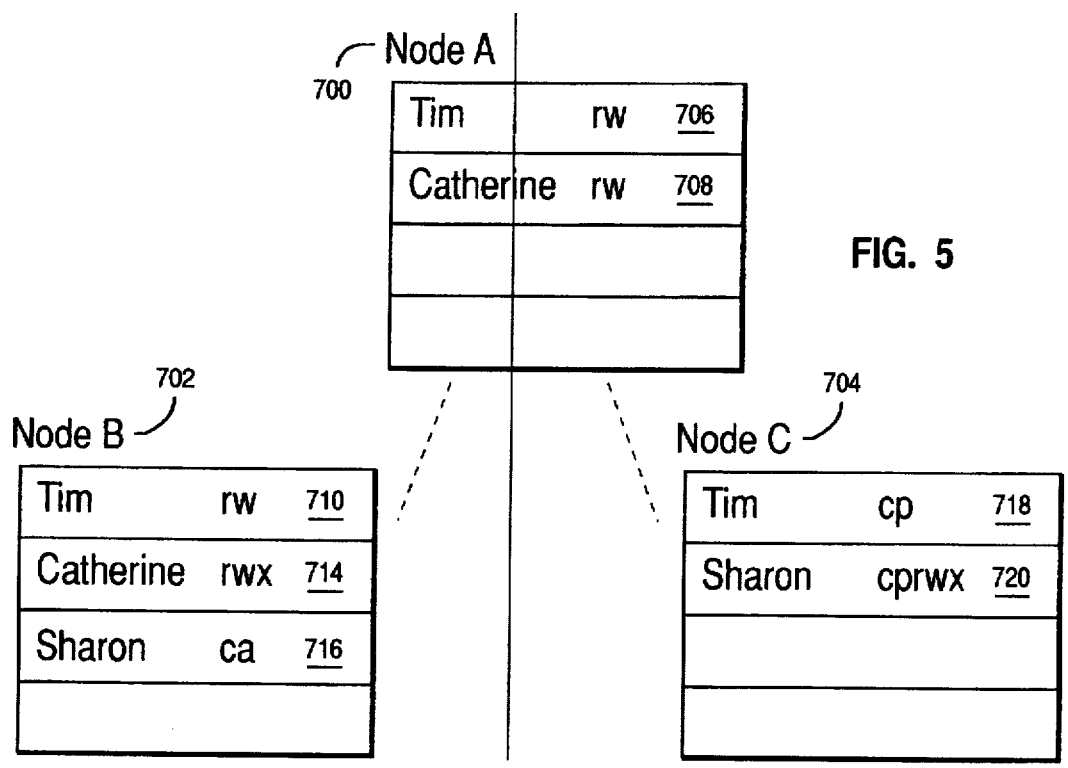
FIG. 5 depicts an illustrative node diagram of a network in an initial state showing the permissions initially granted to each user at each node.

An initial state is depicted in FIG. 5 for the three nodes 700–704. Several things may be noted from FIG. 5. First, a number of users are associated with each of the nodes. A user such as Tim 706 may be an authorized user on more than one node (shown at 710 and 718 with respect to nodes 702 and 704, respectively). It is a matter of choice as to how many nodes a user may be authorized to use. For example, Tim is authorized on all three nodes, whereas Sharon is authorized on nodes 702–704 and Catherine on nodes 700–702.

After each name, alpha characters are shown which are shorthand representations of the permissions granted to the particular user at the particular node. It is an important feature of the invention that each of the nodes may be heterogeneous in the sense that for a given user, the user may have one set of permissions at one node and yet another set of permissions at another node which may each be selectively modified. For example, Tim, 706, in node 700, has "rw" permissions whereas on node 704, Tim has "cp" permissions.

The permissions and their associated abbreviations are as follows:

TABLE 2

| a | Modify attributes |
| --- | --- |
| c | Create |
| p | Modify permissions |
| r | Read |
| w | Write |
| x | Execute |

FIG. 5 depicts an initial state of the system with various of the aforementioned permissions previously having been assigned to each of the users. Thus, in this initial state, with respect to node A, Tim and Catherine, 706 and 708, respectively, may be seen to have been granted read and write permission. With respect to node B, Tim also has read, write permission 710, whereas Catherine, at 714, is additionally granted execute authority ("x") and Sharon, 716, has create and modify attributes permissions ("c", "a"). With respect to node C, Tim, 718, has create and modify permissions authority whereas Sharon, 720, has create, modify permissions, read, write, and execute authority.

Figure 6:
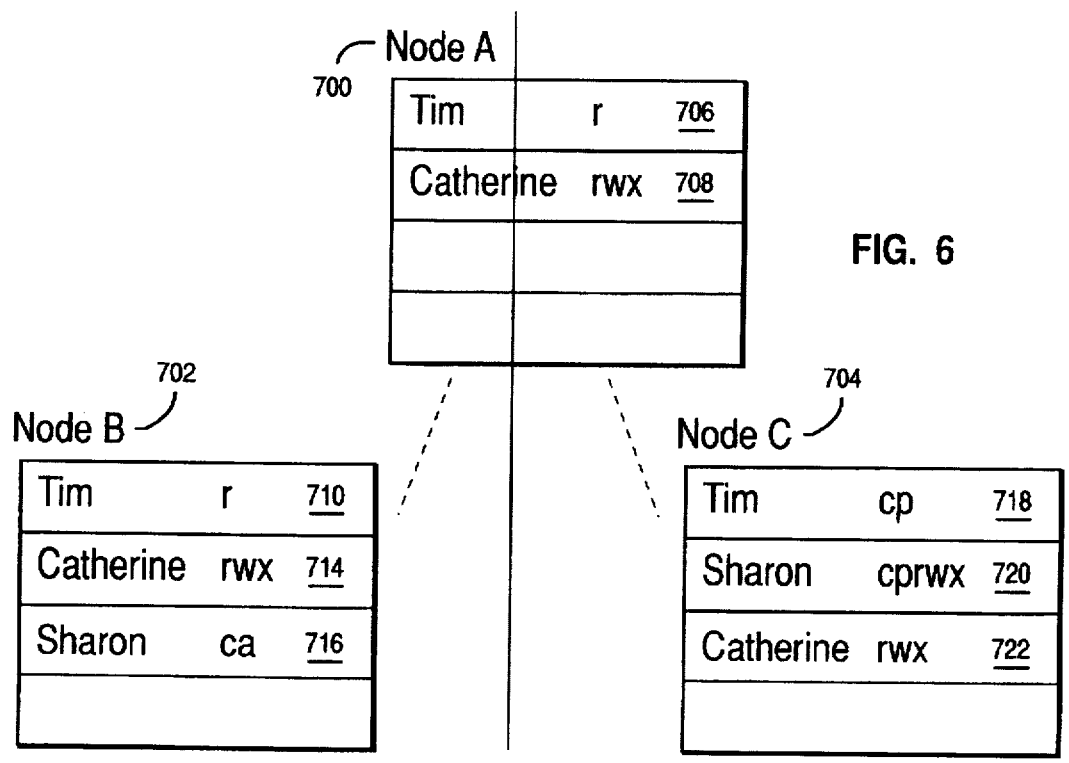
FIG. 6 depicts the node diagram of FIG. 5 after a Modify operation.

Referring now to FIG. 6, it will be assumed that certain "Modify" operations will be performed. Specifically, from the initial state of FIG. 5, the following Apply commands will be effected by a system administrator:

| Modify_Delete: | Tim: | w |
| --- | --- | --- |
| Modify_Add_Or_Create: | Catherine: | rwx |

Referring first to node A, 700, in FIG. 6, comparing Tim's permissions at 706 with the corresponding permissions in FIG. 5, it will be noted that Tim permission is modified in FIG. 6 and the write permission (w) is deleted. Similarly, Catherine is modified and granted execute permission in node A of FIG. 6 whereas previously in node A (FIG. 5), she only had read and write permission.

With respect to node B, 702, in FIG. 6, Tim's permissions, 710 are similarly modified such that the write permission (w) is deleted, leaving only "r" permission. Catherine's permissions, 714, remain unchanged in that she is maintaining the previously granted read, write and execute permissions 714 in node B of FIG. 5.

In node C, 704, of FIG. 6, Tim is not modified, 718, to delete write permission because he was not granted write permission at that node previously as shown in the initial state, node C, 704, of FIG. 5. Also with respect to this node C of FIG. 5, it will be noted that Catherine had no permissions at the initial state. However, because of the Apply command, it will be noted that Catherine permissions are created in node C of FIG. 6 with the rwx permissions, 722.

Figure 7:
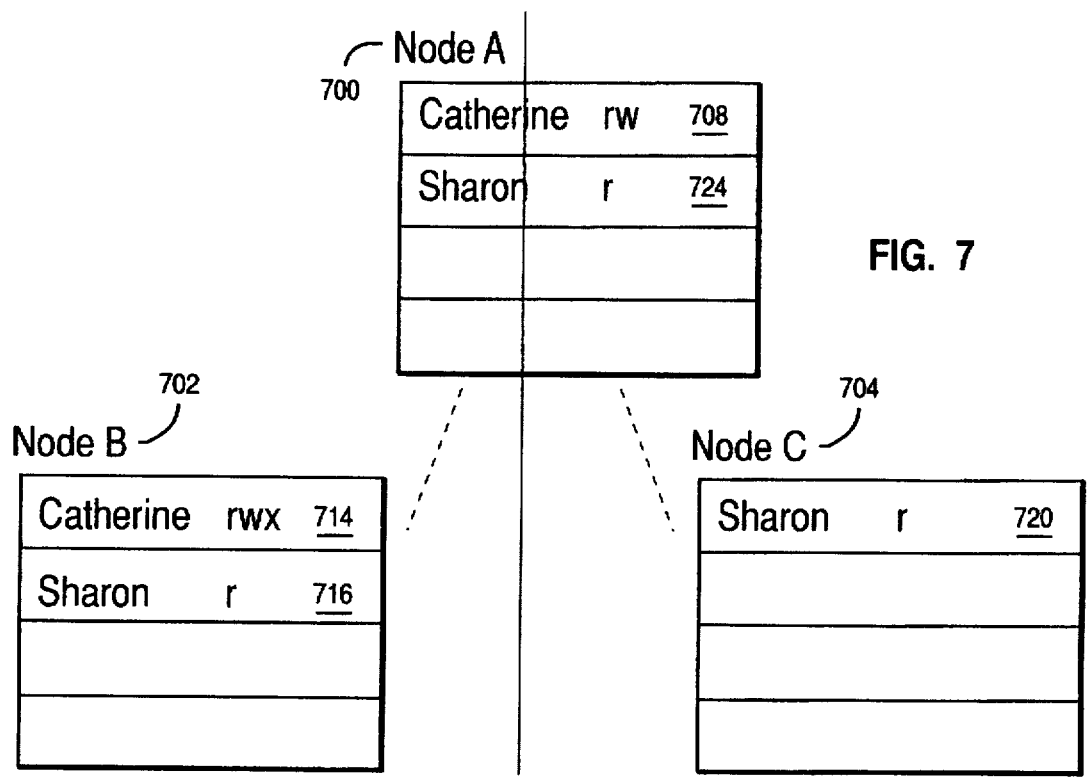
FIG. 7 depicts the node diagram of FIG. 5 after an Absolute operation.

Turning now to FIG. 7, from the initial state of FIG. 5, it will now be assumed that a "Absolute" operation will be performed. In this case, the Apply commands are:

| delete: | Tim | |
|---|---|---|
| replace_or_create: | Sharon: | r |

It will now be noted because of the aforementioned commands, that Tim has been deleted from node A in FIG. 7, and Sharon permissions have been created with the read (r) permission, 724.

With respect to node B, 702, of FIG. 7, again Tim permissions have been deleted and Sharon's initial state permissions (ca, 716, of FIG. 5) have been replaced with the designated r permission.

Finally, with respect to node C, 704 of FIG. 7, again Tim has been deleted and Sharon's previous cprwx permissions ((720), FIG. 5 in node C) have been replaced with the r permission.

Finally, from the initial state of FIG. 5, for illustrative purposes, it will be assumed that a "Rename" operation is desired, in which case the following Apply command will be issued:

| User_Rename: | Catherine: | Nathanael |
|---|---|---|

Figure 8:
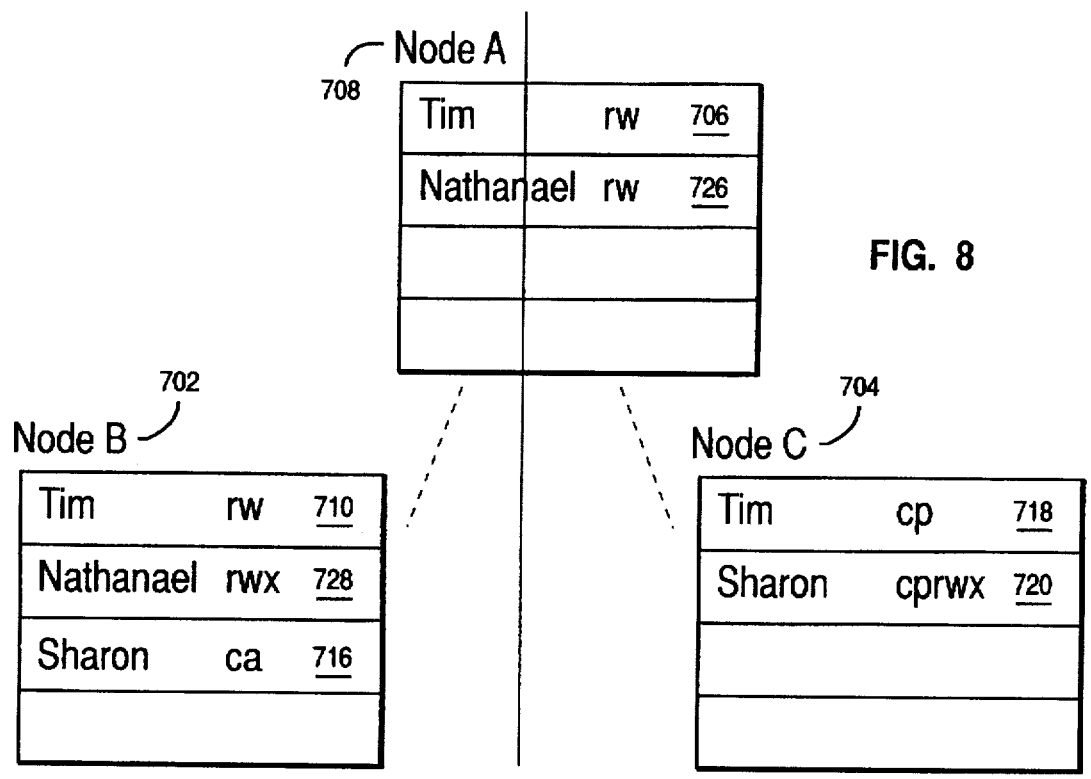
FIG. 8 depicts the node diagram of FIG. 5 after a Rename operation.

Referring to FIG. 8, in node A, 700, it will be noted that Catherine's rw permissions (708, node A, FIG. 5) have been given to the user Nathanael, 726 at node A, FIG. 8. Similarly, at node B in FIG. 8, Catherine's "rwx" permissions in the initial state shown in node B of FIG. 5, 714, have been given to user Nathanael, 728.

Finally, with respect to node C of FIG. 8, 704, since there was no entry for Catherine in node C of the initial state in FIG. 5, no operation is performed.

As will be readily appreciated by one of ordinary skill in the art, in implementing the invention on a data processing system, data structures will be required. Accordingly, in Table 3, a representative set of such data structures is set forth as follows (wherein reference to DCE is to the UNIX Distributed Computing Environment being promulgated by the IBM Corporation, Hewlett Packard Corporation, and others).

It will further be appreciated that in order to implement the invention in a data processing system, that application program interfaces (APIs) will be required. A representative set of such APIs suitable for implementing the invention may be seen set forth in detail in Table 3 which follows.

TABLE 3

| ent_entries_to_manipulate_t | | |
|---|---|---|
| This data type is a structure of 2 elements | | |
| | 1) num_entries_to_change | An unsigned32 specifying how large the companion array |
| entries_to_change_list. | | |
| | 2) entries_to_change_list | Is an array of structures of type end_entry_to_manipulate_t |
| ent_entry_to_manipulate_t | | |
| This data structure has 2 elements | | |
| | 1) action | An unsigned 32 specifying what action to take on the associated sec_acl_entry_t. The actions are: ENTRY_ADD, ENTRY_DELETE, ENTRY_MODIFY, ENTRY_REPLACE, ENTRY_MODIFY_OR_ADD, ENTRY_REPLACE_OR_ADD, ENTRY_CHANGE_USER, ENTRY_CHANGE_GROUP. |
| | 2) entry_to_manipulate | A sec_acl_entry_t specifying the entry to manipulate. sec_acl_entry_t is the same structure defined by the DCE code. |
| user_to_replace_t | | |
| | 1) name | ASCIIZ strong of current id |
| | 2) UUID | UUID of current id |
| | 3) new_name | ASCIIZ string of replacement id |
| | 4) UUID | UUID of replacement id |

In like manner, in order to implement the invention, it will be readily apparent that a set of application program interfaces (APIs) will be necessary. Accordingly, a representative such set of APIs which indicate the logic flow is hereinafter provided in Table 4.

TABLE 4 ent_acl_entries_manipulate
   This API provides a way to manipulate (add, delete, modify, replace)
one or more entries of a particular ACL.
Syntax
   ent_acl_manipulate_entries (
                     sec_acl_handle_t          h,
                     uuid_t                    *manager_type,
                     sec_acl_type_t            sec_acl_type,
                     ent_entries_manipulate_t  *entries_to_change,
                     error_status_t            *status
                     )

Parameters
   h                    Handle to the target object. Usually gotten by
                        sec_acl_bind.
   manager_type         A UUID pointer indicating the type of the ACL
                        manager protecting the object referred to by h.
   sec_acl_type         The ACL type. Objects can have multiple ACLs
                        associated with them. For example, ACL on the
                        object itself, an initial (default) object
                        ACL of the object, a initial (default) container
                        object ACL for the object. - sec_acl_type_object
                            - sec_acl_type_default_object
                            - sec_acl_type_default_container
   entries_to_change    A pointer to ent_entries_to manipulate_t type
                        which essentially is a list of sec_acl_entry_t
                        with associated action.
   status               A pointer to status of the cell.
Pseudo Code
       check parameters & buffers
       call sec_acl_lookup
       is ACL is not found
               error
       else /* ACL exists */
               for all entries in entries to change
                   switch on action
                   case add
                           search for the entry
                           if found
                                   error
                           else
                                   add
                   case Modify
                           if found
                                   modify
                           else
                                   error
                   case replace
                           if found
                                   replace
                           else
                                   error
                   case delete
                           if found
                                   delete
                           else
                                   error
                   case add_or_modify
                           if found
                                   modify
                           else
                                   replace
                   case replace_or_add
                           if found
                                   replace
                           else
                                   add
                   case dafault
                                   error
               if no errors
                   call sec_acl_replace
ent_acl_manipulate_entries_apply_to_tree
   This API recursively traverse a container and its subordinates manipulating
the ACL entries, when appropriate. The difference between the API and the
end_acl_replace_apply is ent_acl_replace_apply works on entire ACLs. The
granularity of this API is much finer in that it manipulates individual
entries for particular ACL types, for the container and all its subordinate
containers and objects.
Syntax ent_acl_maipulate_entries_apply_to_tree
              (

TABLE 4-continued

|  |  |  |
|---|---|---|
| | unsigned_char_p_t | resource_global_name, |
| | uuid_t | *manager_type, |
| | sec_acl_type_t | sec_acl_type. |
| | ent_entries_to_manipulate_t | *entries_to_change, |
| | unsigned32 | tolerance, |
| | unsigned 32 | recursion, |
| | char | *error_buffer, |
| | unsigned32 | error_buffer_size, |
| | unsigned32 | *num_errors |
| | error_status_t | *status |
| Parameters | | |
| | resource_global_name | A pointer to a NULL terminating string referring to the resource from where the apply should begin. The resource itself is included in the apply operations (its) ACL entries are manipulated if appropriate). The resource has to be a container. |
| | manager_type | A UUID pointer indicating the type of the ACL manager protecting the object referred to by h. |
| | sec_acl_type | The ACL type. Objects can have multiple ACL's associated with them. For example, ACL on the object itself, an initial (default) object ACL of the object, an initial (default) container object ACL for the object.<br>- sec_acl_type_object<br>- sec_acl_type_default_object<br>- sec_acl_type_default_container |
| | entries_to_change | A pointer to ent_entries_to_manipulate_t type which essentially is a list of sec_acl_entry_t with associated actions. |
| | tolerance | if TRUE and an ACCESS_DENIED occurs while traversing the tree do not stop processing, keep applying. |
| | error_buffer | buffer to hold array or error_entry_t structures. Resource names are placed at end of buffer. |
| | error_buffer_size | size of error_buffer in bytes. |
| | num_errors | The number of error_entry_t_structures that were returned in error_buffer |
| | error_buffer_size status | A pointer to status of the call. |
| Pseudo Code | | |

```
chekc parameters & buffers
If the resource is an object (not a container)
        error
else
        /* manipulate this particular resource's ACL */
        sec_acl_bind (resource_gloabl_name, bind_to_entry, h,
                      status)
        err = ent_acl_maniuplate_entries ( . . .
        if input ACL type == sec_acl_type_object
        for each object
                err = ent_acl_manipulate_entries ( )
                if tolerance && err == ACCESS_DENIES
                        continue
                else
                        error
if recursion
        for each directory
                err = ent_acl_manipulate_entries_
                        apply_to_tree (
                                full_path_of subdirectory,
                                entries_to_change,
                                sec_acl_type,
                                tolerance = TRUE,
                                error
                        )
                if tolerance && err == ACCESS_DENIED
                        continue
                else
                        error
``` ent_acl_manipulate_entries_apply_to_set
Description This API iterates over set of specified resources and applies the list of changes specified.
Syntax ent_acl_manipulate_entries_apply_to_set
    (

TABLE 4-continued

```
                    unsigned_char_p_t         resource_global_name,
                    uuid_t                    *manager_type,
                    sec_acl_type_t            sec_acl_type,
                    ent_entries_to_manipulate_t  *entries_to_change,
                    unsigned32                tolerance,
                    char                      *error_buffer
                    unsigned32                error_buffer_size,
                    unsigned32                *num_errors
                    error_status_t            *status
                )
```

Parameters
- resource_global_name — A pointer to a NULL terminating string referring to the resource from where the apply should begin. The resource itself is included in the apply operation (its ACL entries are manipulated if appropriate). ACL entries are manipulated if appropriate). The resource has to be a container.
- manager_type — A UUID pointer indicating the type of the ACL manager protecting the object referred to by h.
- sec_acl_type — The ACL type. Objects can have multiple ACLs associated with them. For example ACL on the object itself, an initial (default) object ACL of the object, an initial (default) container object ACL for the object.
  - sec_acl_type_object
  - sec_acl_type_default_object
  - sec_acl_type_default_container
- entries_to_change — A pointer to ent_entries_to_manipulate_t type which essentailly is a list of sec_acl_entry_t with associated actions.
- tolerance — if TRUE and an ACCESS_DENIED occurs while traversing the tree do not stop processing, keep applying.
- error_buffer — buffer to hold array of error_entry_t structures. Resource names are placed at end of buffer.
- error_buffer_size — size of error_buffer in bytes.
- num_errors — The number of error_entry_t structures that were returned in error_buffer
- status — A pointer to status of the call.

Pseudo Code
```
check parameters & buffers
for each object in list
        sec_acl_bind ( )
        ent_acl_manipulate_entries ( )
        if err
                write error to buffer
        if tolerance
                continue
        else
                error
``` ent_acl_replace_apply_to_tree
Description This API iterates over specified resource tree and replaces the existing ACL entries with the input entries.
Syntax ent_acl_replace_apply
```
                (
                    unsigned_char_p_t         resource_global_name,
                    uuid_t                    *manager_type,
                    sec_acl_type_t            sec_acl_type,
                    sec_acl_list_t            *entries_to_change,
                    unsigned32                tolerance,
                    unsigned32                recursion,
                    char                      *error_buffer,
                    unsigned32                error_buffer_size,
                    unsigned32                num_errors
                    error_status_t            *status
                )
```

Parameters
- resource_global_name — A pointer to a NULL terminating string referring to the resource from where the apply should begin. The resource itself is included in the apply operation (its ACL entries are manipulated if appropriate). The object has to be a container.
- manager_type — A UUID pointer indicating the type of the ACL manager protecting the object.
- sec_acl_type — The ACL type. Objects can have multiple ACL's

TABLE 4-continued

|  |  |
|---|---|
|  | associated with them. For example ACL on the object itself, an initial (default) object ACL of the object, an initial (default) container object ACL for the object.<br>- sec_acl_type_object<br>- sec_acl_type_default_object<br>- sec_acl_type_default_container |
| sec_acl_list_t | The ACL to apply. Refer to sec_acl_replace API |
| tolerance | if TRUE and an ACCESS_DENIED occurs while traversing the tree do not stop processing, keep applying. |
| recursion | Whether to apply for the first tree level only, or to apply for the entire depth of the tree. |
| error_buffer | buffer to hold array of error_entry_t structures. Resource names are placed at end of buffer. |
| num_errors | The number of error_entry_t structures that were returned in error_buffer |
| status | A pointer to status of the call. |

```
check parameters & buffers
        If the resource is an object is an object (not a container)
    error
else /* object is a container */
        sec_acl_bind
        get all objects
        for each object
                sec_acl_bind( )
                sec_acl_replace( )
                if err && tolerance
                        log_error
                else
                        return error
        if recursion
                get all containers
                for each subdirectory
                        err ent_acl_replace_apply_to_tree ( . . .
                        if err && tolerance
                                log_error
                        else
                                return error
``` ent_acl_replace_apply_to_set
Description This API iterates over set of specified resources and applies the list of changes specified.
Syntax ent_acl_replace_apply_to_set
(

| | | |
|---|---|---|
| | unsigned_char_p_t | resource_global_name, |
| | uuid_t | *manager_type, |
| | sec_acl_type_t | sec_acl_type, |
| | sec_acl_list_t | *entries_to_change, |
| | unsigned32 | tolerance, |
| | unsigned32 | recursion, |
| | char | *error_buffer, |
| | unsigned32 | error_buffer_size, |
| | unsigned32 | *num_errors |
| | error_status_t | *status |

Parameters

| | |
|---|---|
| resource_global_name | A pointer to a NULL terminating string referring to the resource from where the apply should begin. The resource itself is included in the apply operation (its ACL entries are manipulated if appropriate). The object has to be a container. |
| manager_type | A UUID pointer indicating the type of the ACL manager protecting the object. |
| sec_acl_type | The ACL type. Objects can have multiple ACLs associated with them. For example ACL on the object itself, an initial (default) object ACL of the object, an initial (default) container object ACL for the object.<br>- sec_acl_type_object<br>- sec_acl_type_default_object<br>- sec_acl_type_default_container. |
| sec_acl_list_t | The ACL to apply. Refer to sec_acl_replace API |
| tolerance | if TRUE and an ACCESS_DENIED occurs while traversing the tree do not stop processing, keep applying. |
| recursion | Whether to apply for the first tree level only, or to apply for the entire depth of the tree. |
| error_buffer | buffer to hold array of error_entry_t |

TABLE 4-continued

```
                                    structures. Resource names are placed at end of
                                    buffer.
            error_buffer_size       size of error_buffer in bytes.
            num_errors              The number of error_entry_t structures that were
                                    returned in error_buffer
            status                  A pointer to status of the call.
Pseudo Code
            check parameters & buffers
            for each object in list
                        sec_acl_bind ( )
                        sec_acl_replace ( )
                        if err
                                    write error to buffer
                                    if tolerance
                                                log error
                        else
                                                return error
```

While the invention has been shown and described with reference to particular embodiments thereof, it will be understood by those skilled in the art that the foregoing and other changes in form and detail may be made therein without departing from the spirit and scope of the invention.

We claim:

1. For use in a data processing system having hierarchically structured access control lists (ACL), each with entries comprising a plurality of actions and data, a computerized method for managing said ACLs, comprising:

editing a selected subset of said ACLs;

executing an apply function on said ACLs; and generating, in response to said executing, a heterogeneous group of said ACLs corresponding to said selected subset of said ACLs.

2. The method of claim 1 wherein said data is taken from the group comprising users, groups, entry ids, and permissions.

3. The method of claim 2 wherein said actions are selected from the group comprising entry_change_user, entry_change_group, entry_create, entry_delete, entry_replace, entry_modify_add, entry_modify_delete, entry_add_or_create, entry_modify_add, entry_replace_or_create, entry_replace_add.

4. The method of claim 3 wherein said editing said selected subset of ACLs comprises:

editing at least two said ACLs to each contain a different said permission for one of said users.

5. The method of claim 4 wherein said data for said user is a current user and a corresponding new user.

6. The method of claim 5 wherein said data for said group is a current group and a corresponding new group.

7. The method of claim 6 further including specifying in a table a universal user id having associated therewith a first user and said subset of edited ACLs;

editing said table to substitute a second user for said first user; and in response to said editing, automatically reassigning all said edited ACLs from said first user to said second user.

8. The method of claim 7 including establishing an error buffer;

identifying, in response to said executing of said apply function, selected ones of said edited selected subset of said ACLs which fail during said executing; and writing to said buffer a resource name and error corresponding to each said identified one of said ACLs which fail.

9. The method of claim 8 wherein said selected subset of said ACLs is selected by steps comprising:

specifying a resource name as a root of a tree containing a plurality of objects;

iterating on said tree to locate a subset of said objects; and operating upon said subset of objects.

10. The method of claim 8 wherein said selected subset of said ACLs is selected by the steps comprising:

specifying a set of resource names each having associated therewith a corresponding one of said ACLs;

iterating on said set; and updating each said corresponding one of said ACLs for each of said resource names in response to said iterating.

11. The apparatus of claim 2 wherein said actions are selected from the group comprising entry_change_user, entry_change_group, entry_create, entry_delete, entry_replace, entry_modify_add, entry_modify_delete, entry_add_or_create, entry_modify_add, entry_replace_or_create, entry_replace_add.

12. The apparatus of claim 11 wherein said means for editing said selected subset of ACLs comprises:

means for editing at least two said ACLs to each contain a different said permission for one of said users.

13. The apparatus of claim 12 wherein said data for said user is a current user and a corresponding new user.

14. The apparatus of claim 13 wherein said data for said group is a current group and a corresponding new group.

15. The apparatus of claim 14 further including means for specifying in a table a universal user id having associated therewith a first user and said subset of edited ACLs;

means for editing said table to substitute a second user for said first user; and means for automatically re-assigning, in response to said means for editing, all said edited ACLs from said first user to said second user.

16. The apparatus of claim 15 including means for establishing an error buffer;

means for identifying, in response to said executing of said apply function, selected ones of said edited selected subset of said ACLs which fail during said executing; and means for writing to said buffer a resource name and error corresponding to each said identified one of said ACLs which fail.

17. The apparatus of claim 16 wherein said means for selecting said subset of said ACLs comprises:

means for specifying a resource name as a root of a tree containing a plurality of objects;

means for iterating on said tree to locate a subset of said objects; and means for operating upon said subset of objects.

18. The apparatus of claim 16 wherein said means for selecting said subset of said ACLs comprises:

means for specifying a set of resource names each having associated therewith a corresponding one of said ACLs;

means for iterating on said set; and means for updating each said corresponding one of said ACLs for each of said resource names in response to said iterating.

19. Apparatus for use in a data processing system having hierarchically structured access control lists (ACL), each with entries comprising a plurality of actions and data, a computerized method for managing said ACLs, comprising:

means for editing a selected subset of said ACLs;

means for executing an apply function on said ACLs; and means for generating, in response to said executing, a heterogeneous group of said ACLs corresponding to said selected subset of said ACLs.

20. The apparatus of claim 19 wherein said data is taken from the group comprising users, groups, entry ids, and permissions.

* * * * *